(12) United States Patent
Yeung et al.

(10) Patent No.: US 8,242,049 B2
(45) Date of Patent: Aug. 14, 2012

(54) LOW TEMPERATURE AMMONIA REMEDIATION CATALYSTS

(75) Inventors: King-Lun Yeung, Hong Kong (HK);
Pik-Ying Lui, Hong Kong (HK);
Ka-Yee Ho, Hong Kong (HK); Miguel Angel Banares, Madrid (ES)

(73) Assignee: The Hong Kong University of Science and Technology, Kowloon (HK)

( * ) Notice: Subject to any disclaimer, the term of this patent is extended or adjusted under 35 U.S.C. 154(b) by 393 days.

(21) Appl. No.: 11/567,750

(22) Filed: Dec. 7, 2006

(65) Prior Publication Data

US 2007/0149391 A1    Jun. 28, 2007

Related U.S. Application Data

(60) Provisional application No. 60/748,340, filed on Dec. 8, 2005.

(51) Int. Cl.
*B01J 21/06* (2006.01)
*B01J 23/22* (2006.01)
*B01J 23/20* (2006.01)
*B01J 37/02* (2006.01)
*B01J 37/025* (2006.01)
*B01J 35/10* (2006.01)
*B01D 53/54* (2006.01)
*B01D 53/56* (2006.01)
*B01D 53/58* (2006.01)

(52) U.S. Cl. ........ 502/350; 502/300; 502/353; 502/439; 423/235; 423/237; 423/239.1; 423/598; 423/594.8

(58) Field of Classification Search .................. 502/300, 502/353, 349, 350, 439; 423/237, 239.1, 423/235, 598, 594.8
See application file for complete search history.

(56) References Cited

U.S. PATENT DOCUMENTS 4,861,747 A * 8/1989 Wachs et al. .................. 502/325
(Continued)

FOREIGN PATENT DOCUMENTS

JP       11-104495        4/1999
(Continued)

OTHER PUBLICATIONS

H. Kominami, Y. Takada, H. Yamagiwa, Y. Kera, M. Inoue, and T. Inui, "Synthesis of thermally stable nanocrystalline anatase by high-temperature hydroylsis of titanium alkoxide with water dissolved in organic solvent from gas phase" Journal of Materials Science Letters 15 (1996), pp. 197-200.*

(Continued)

*Primary Examiner* — Stanley Silverman
*Assistant Examiner* — Diana J Liao
(74) *Attorney, Agent, or Firm* — The Nath Law Group; Jerald L. Meyer

(57) ABSTRACT

A catalytic material which includes a metal oxide catalyst anchored to a nano-sized metal oxide crystal as support and functions well at low temperatures. The catalytic material may optionally include another metal oxide as a promoter deposited on the surface of the support to modify the properties of the metal oxide catalyst and/or the properties of the support. The catalyst may be vanadium oxide, tungsten oxide, manganese oxide, chromium oxide or molybdenum oxide; the support may be $TiO_2$, $SiO_2$, $Al_2O_3$, $ZrO_2$, or $WO_3$; and the promoter may be vanadium oxide, tungsten oxide, manganese oxide, chromium oxide or molybdenum oxide. The present invention also provides a method of producing the catalytic materials, which is useful in removing ammonia and other nitrogen containing contaminants.

23 Claims, 16 Drawing Sheets

(A)

(B)

U.S. PATENT DOCUMENTS

| | | | |
|---|---|---|---|
| 4,891,348 A * | 1/1990 | Imanari et al. | 502/309 |
| 4,916,106 A * | 4/1990 | Koschlig et al. | 502/309 |
| 5,591,414 A | 1/1997 | Jacob et al. | |
| 5,753,582 A * | 5/1998 | Garcin et al. | 502/323 |
| 6,274,763 B1 * | 8/2001 | Ruedinger et al. | 562/548 |

FOREIGN PATENT DOCUMENTS

| | | |
|---|---|---|
| JP | 2004-033936 | 2/2004 |
| KR | 2001-0109533 | 12/2001 |

OTHER PUBLICATIONS

Komandur V. R. Chary, Gurram Kishan, Thallada Bhaskar, and Chokkaram Sivaraj, "Structure and Reactivity of Vanadium Oxide Catalysts Supported on Anatase TiO2," J. Phys. Chem. B (1998), 102, pp. 6792-6798.*

H. Kominami, Jun-ichi Kato, Y. Takada, Y. Doushi, B. Ohtani, Sei-ichi Nishimoto, M. Inoue, T. Inui and Y. Kera, "Novel synthesis of microcrystalline titanium(IV) oxide having high thermal stability and ultra-high photocatalytic activity: thermal decomposition of titanium(IV) alkoxide in organic solvents," Catalysis Letters 46 (1997), pp. 235-240.*

Ono et al., "Catalytic combustion of odors in domestic spaces on ion-exchanged zeolites", Applied Catalysis B: Environmental, 16, pp. 227-233, 1998.

Watanabe et al., "Removal of unpleasant odor gases using an Ag-Mn catalyst", Applied Catalysis B: Environmental, 8, pp. 405-415, 1996.

* cited by examiner (A)

(B)

(A)

(B)

LOW TEMPERATURE AMMONIA REMEDIATION CATALYSTS

CROSS REFERENCE TO RELATED APPLICATION

Pursuant to 35 U.S.C. §119(e), this application claims priority to U.S. Provisional Application No. 60/748,340, filed Dec. 8, 2005, the contents of which are hereby incorporated by reference.

FIELD OF THE INVENTION

The present invention relates to the supported metal catalysts. In particular, it relates to supported metal oxide catalysts in the form of monomer or polymer on the support surface and substantially free of cluster formation, and to the application of the supported catalysts in remediation of ammonia ($NH_3$) and nitrogen containing compounds at low temperature and in the absence of UV illumination.

BACKGROUND OF THE INVENTION

Ammonia ($NH_3$) and other nitrogen containing compounds (often with odorous and unpleasant smell) are contaminants in the air, harmful to human health. Methods have been developed to eliminate such contaminants.

Supported metal oxide catalysts are found to be effective in selective catalytic oxidation of $NH_3$ and nitrogen containing compounds. (see L. Gang, J. van Grondelle, B. G. Anderson and R. A. van Santen, J. Catal. 186: 100-109 (1999); L. Gang, B. G. Anderson, J. van Grondelle, R. A. van Santen, W. J. H. van Gennip, J. W. Niemantsverdriet, P. J. Kooyman, A. Knoester and H. H. Brongersma, J. Catal. 206: 60 (2002); Lu Gang, B. G. Anderson, J. van Grondelle and R. A. van Santen, Appl. Catal. B 40: 101 (2003)).

In the prior art, supported metal oxide catalysts usually comprise of nano-sized metal oxide particles in the crystalline form adhered to another metal oxide support. One disadvantage of such supported metal oxide catalyst is the low catalytic activity at low temperature. Thus, a high temperature (>250° C.) is required for efficient degradation. Another disadvantage is the high metal oxide loading and formation of by-products (e.g. nitrogen oxides (NOx) and nitrous oxides $N_2O$) because of the selectivity problem of these catalysts. A new process is needed to prepare novel support material for supporting meal oxide catalyst so that the catalyst exists on the support material in the form of monomer or polymer but not in the crystalline form to enhance the catalyst's activity and selectivity.

SUMMARY OF THE INVENTION

As one object of the present invention, there is provided a catalytic material wherein a metal oxide catalyst in the forms of monomers and/or polymers (depending on the degree of loading) is deposited on the surface of another metal oxide as support and is substantially free of metal oxide clusters on the support surface. As a result, the catalytic material of the present invention is stable and active at low temperature.

In one embodiment, illustrated by formula (A), the catalytic material of the present invention comprises a support metal oxide and a metal oxide catalyst attached to the surface of the support metal oxide. The metal oxide catalyst is anchored to the surface, in monomeric or polymeric form or the mixture thereof, by direct deposition on the support metal oxide. The support metal oxide is in a crystal form. Preferably, the crystal form of the support metal oxide has a size of about 3 to 25 nm, more preferably, about 7 to 15 nm. Also preferably, the crystallinity of the support oxide is 100%. The support metal oxide is preferably selected from the group consisting of $TiO_2$, $SiO_2$, $Al_2O_3$, $ZrO_2$ and $WO_3$. More preferably, the support metal oxide is $TiO_2$.

In another embodiment, illustrated in formula (B), the catalytic material of the present invention further comprises another metal oxide as a promoter together with the metal oxide catalyst on the surface of the support metal oxide. The metal oxide catalyst and the support metal oxide are as described above. Preferably, the promoter is in monomeric or polymeric form or the mixture thereof on the surface of the support metal oxide. The promoter can be any metal oxide that can form monomeric or polymeric layers. Preferably, it is selected from the group consisting of vanadium oxide, tungsten oxide, manganese oxide, chromium oxide and molybdenum oxide. The loading of the promoter metal oxide is about 0.1 to 1 monolayer on the support.

The promoter promotes the catalytic effect of the metal oxide catalyst anchored on the support. It may also directly or indirectly modify the electronic and catalytic properties of both the metal oxide catalyst and/or the support metal oxide. Preferably, the promoter is deposited at the same time when the metal oxide catalyst is deposited onto the support surface, although it can be deposited onto the support before or after the catalyst is being deposited. Preferably, the atomic ratio of the metal element in the metal oxide catalyst to the metal element in the metal oxide promoter is in the range between 1:2 to 1:40, more preferably, 1:4 to 1:20.

In the catalytic material of the present invention, the metal oxide catalyst is generally an oxide of a transition metal. Preferably, the catalyst is selected from the group consisting of vanadium oxide, tungsten oxide, manganese oxide, chromium oxide and molybdenum oxide. More preferably, vanadium oxide is used as the metal oxide catalyst. The loading of the metal catalyst on the support metal oxide is preferably in the range of about 1 to 25% (by weight) of the total weight, more preferably about 1% to 15%.

As another object of the present invention, there is provided a method of producing the above described catalytic material. In one embodiment, the present invention provides a method for producing a catalytic material comprising the steps of: (a) depositing a metal catalyst precursor on the surface of a metal oxide support; (b) converting said metal catalyst precursor to an active oxide catalyst; and (c) removing some hydroxyl groups from the surface of said metal oxide support.

As another object of the present invention, there is provided a method of purifying the air by removing ammonia and other nitrogen-containing compounds from the air. In one embodiment, the catalytic material of the present invention is contacted with a sample (such as an airflow) and reduction in the level of the contaminants is realized.

The various features of novelty which characterize the invention are pointed out with particularity in the claims annexed to and forming a part of this disclosure. For a better understanding of the invention, its operating advantages, and specific objects attained by its use, reference should be made to the drawings and the following description in which there are illustrated and described preferred embodiments of the invention.

DETAILED DESCRIPTION OF PARTICULAR EMBODIMENTS

Catalytic Materials

Figure 1:
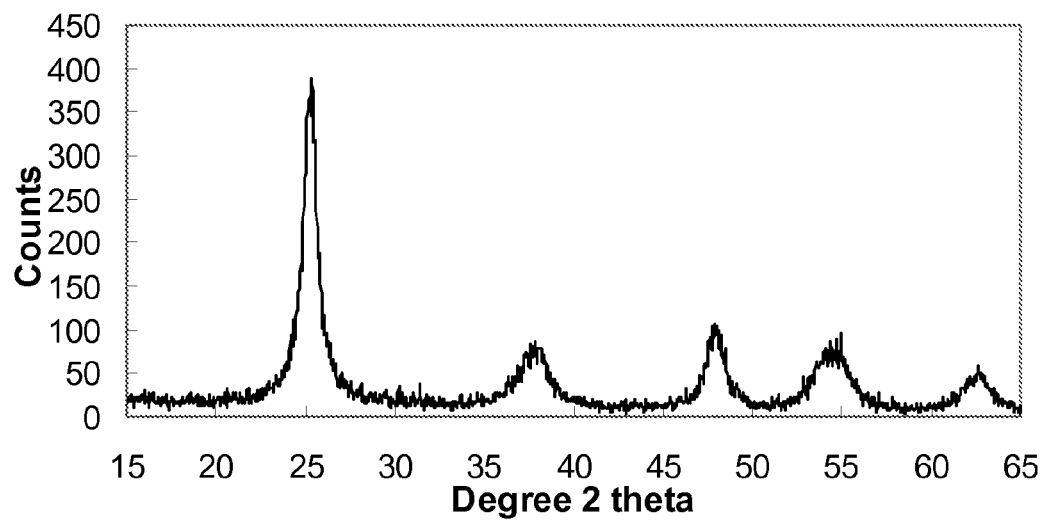
FIG. 1 shows the X-Ray Diffraction pattern (XRD) of pure anatase nanostructured $TiO_2$ crystals (A); and the X-Ray Diffraction pattern (XRD) of (a) V1Ti-c and (b) V1Ti-o, 1% vanadium by weight on TiO$_2$, pretreated by air calcination and ozonation at 200° C., respectively (B).
Figure 1:
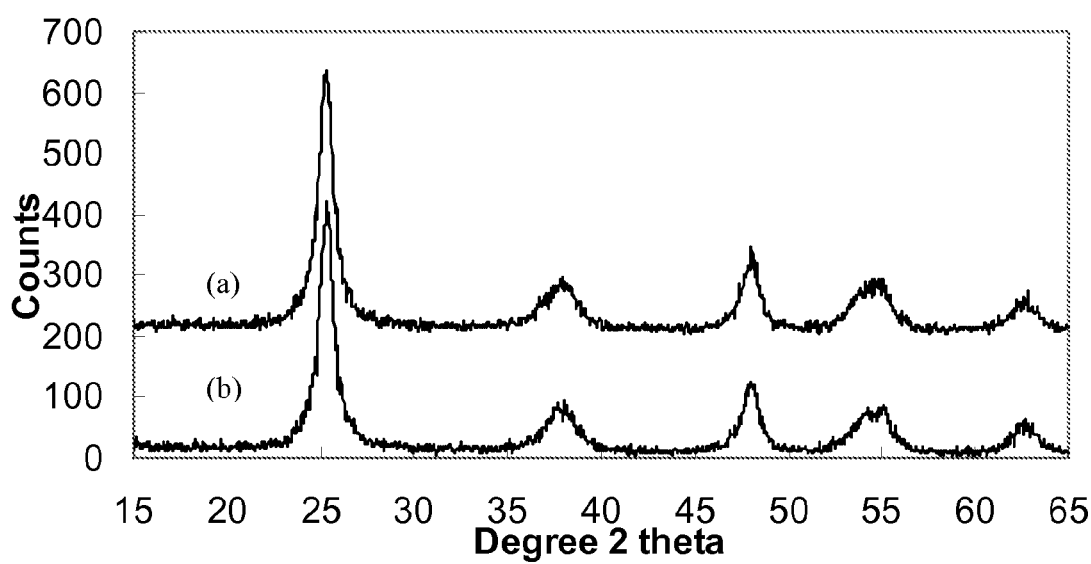

One particular group of catalytic materials of the present invention is represented by Formula (A):

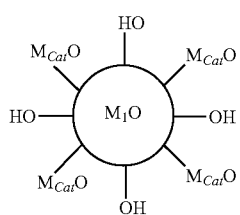

Formula (A)

In the above formula, "$M_1O$" is metal oxide serving as the support, on the surface of which there are a plurality of hydroxyl groups "—OH" and a plurality of metal oxide catalyst—"$M_{cat}O$". The metal oxide catalyst becomes directly deposited on the support material surface. Preferably, $M_{cat}O$ has a size of about 3 to about 25 nm, more preferably, about 7 to about 15 nm. $M_1O$ is a crystal. Preferably, its crystal structure is anatase and crystallinity is 100%. $M_1O$ is preferably selected from the group consisting of TiO$_2$, SiO$_2$, Al$_2$O$_3$, ZrO$_2$ and WO$_3$. In a more preferred embodiment, $M_1O$ is TiO$_2$. The loading of $M_{cat}O$ on $M_1O$ is preferably in the range of about 1% to 25% by weight (of total weight of the catalytic material), more preferably about 1% to 15% by weight.

Another particular group of catalytic materials is represented by Formula (B):

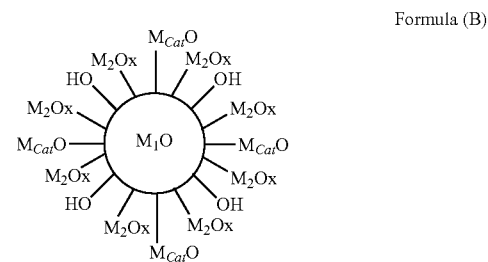

Formula (B)

"$M_1O$" and "$M_{cat}O$" are as described above. "$M_2O_x$" is another metal oxide serving as a promoting agent to improve the catalytic effect of $M_1O$. $M_2O_x$ can also directly or indirectly modify the electronic and catalytic properties of "$M_1O$" and/or "$M_{cat}O$". Preferably, $M_2O_x$ is deposited on the surface of $M_1O$ at the same time as $M_{cat}O$ is deposited thereon. $M_2O_x$ is preferably in a monomeric or polymeric form on the support's surface. $M_2O_x$ is preferably selected from the group consisting of niobium oxide, tantalum oxide, tungsten oxide, zirconia oxide, phosphorus oxide, chromium oxide and molybdenum oxide. The loading of $M_{cat}O$ on $M_1O$ is preferably in the range of about 1% to 25% by weight (of total weight of the catalytic material), more preferably about 1% to 15% by weight. The atomic ratio of $M_{cat}$:$M_2$ is about 1 to 2 to 1 to 40, more preferably, 1 to 4 to 1 to 20.

(I) Preparing Catalytic Materials

The method of preparing the catalytic materials of the present invention comprises generally (a) depositing a metal catalyst precursor on the surface of a metal oxide support; (b) converting the metal catalyst precursor to active metal oxide catalyst; and (c) removing excessive hydroxyl groups from the surface of the support.

The metal catalyst precursor can be deposited onto the surface of another metal oxide by conventional ways well know in the art. After deposition, the metal catalyst precursor is then converted into active metal oxide catalyst. Precursors to many metal oxide catalysts are well known in the art (For general review, refer to R. A. van Santen, P. W. N. M. van Leeuwen, J. A. Moulijn, B. A. Averill, *Catalysis: An Integrated Approach*, second edition, Elsevier (1999)). The catalyst precursors generally exist in salts, preferably water soluble salts. Examples of the metal catalyst precursor include, but are not limited to, nitrate, nitrites, chlorides, acetates, acetylacetonates, hydroxyacetates, or hydroxide salts of the metal catalysts.

After the metal precursor is deposited on the metal oxide crystals, heat treatment is required to make the deposition permanent and remove the debris organic species of the precursor solution from the surface of the metal oxide support.

The following is some particular examples of making the catalytic material of the present invention.

(a) V$_2$O$_5$ Supported on TiO$_2$ (V$_2$O$_5$/TiO$_2$)

As one embodiment of the present invention, V$_2$O$_5$/TiO$_2$ as a supported catalytic material was prepared according to the following procedure:

1. 1.5 g of $TiO_2$ powder was placed in a 250 ml round bottom flask.
2. 3.966 ml of 75 mM ammonium metavanadate solution, $NH_4VO_3$ (Aldrich) was added to $TiO_2$ in a round-bottomed flask.
3. The above mixture of $TiO_2$ and $NH_4VO_3$ was stirred at 60° C. in a water bath for 2 hours.
4. The mixture was then dried in a rotary evaporator at 0.3 bar, 60° C. until it becomes dried powder.
5. The powder was collected by scratching.
6. The powder was further dried in a 115° C. oven for 24 hr.
7. The $V_2O_5/TiO_2$ powder was treated either with ozone (in flowing 100 g/m$^3$) in a quartz tube at 200° C. for 4 hr or with oxygen calcination at 200° C. for 4 hr.

It was determined that one monolayer of the catalyst was formed on the surface of the support ($TiO_2$), with around 8-9 V atoms per nm$^2$ of $TiO_2$. Monomeric vanadium oxide has a distinct peak in Raman spectroscopy and temperature programmed reduction.

The same procedure described above was performed with various ratios of the precursors (for example, $NH_4VO_3$) to the support ($TiO_2$), and from the X-ray photoelectron spectroscopy, the surface atomic concentration of V/Ti was about 0.02 to about 0.24. Although the above procedure was performed with $NH_4VO_3$ as the catalyst precursor, the same procedure may be used with other vanadium compounds to obtained a supported catalytic material of the present invention in the general formula of $VO_x/TiO_2$, where x=1 to 3.

(b) $V_2O_5$ and $Nb_2O_5$ Supported on $TiO_2$ ($V_2O_5/Nb_2O_5/TiO_2$)

As another embodiment of the present invention, ($V_2O_5/Nb_2O_5/TiO_2$) as a supported catalytic material was prepared according to the following procedure:

1. 1.5 g of $TiO_2$ powder was placed in a 250 ml round bottom flask.
2. 3.966 ml of 75 mM ammonium metavanadate solution, $NH_4VO_3$ (Aldrich) was added to $TiO_2$ in the round bottomed flask
3. 1.487 ml of 50 mM of $C_{10}H_8N_2O_{33}Nb_2$ was added to the flask in order to have the V:Nb ratio of 4:1
4. The above mixture of $TiO_2$, $C_{10}H_8N_2O_{33}Nb_2$ and $NH_4VO_3$ was stirred at 60° C. in a water bath for 2 hours.
5. The mixture was then dried in a rotary evaporator at 0.3 bar, 60° C. until it becomes dried powder.
6. The powder was collected by scratching.
7. The powder was further dried in a 115° C. oven for 24 hr.
8. The ($V_2O_5/Nb_2O_5/TiO_2$) powder was treated either with ozone (in flowing 100 g/m$^3$) in a quartz tube at 200° C. for 4 hr or with oxygen calcination at 200° C. for 4 hr.

This preparation was 1 wt. % vanadia supported catalysts promoted by niobium (V:Nb=4:1) and this sample was used for the characterization described in the following. Using the same procedure described above, four different preparations were made each with a different dopant added to 1 wt. % vanadia supported catalyst (each dopant was added to 1 wt. % vanadia in the atomic ratio of V:promoter=4:1). These catalyst samples with different promoters were used to study the effect on the catalytic remediation of ammonia, which will be detailed in the following. The promoters were niobium, zirconia, phosphorus and tungsten. Niobium and vanadia are in the same group in periodic tables; whereas zirconia and titania are in the same group. They are believed to have similar chemical properties and have some promotion effect on catalytic reactions. Phosphorus is acidic in nature which could help capture ammonia that is alkaline in nature. Tungsten is chosen because it is a well known $NO_x$ selective catalytic reduction (SCR) catalysts.

(II) Characterization of the Catalytic Material

Further tests were carried out on the catalytic material of the present invention. Table 1 lists the methods used in characterizing the supported metal oxide catalyst of the present invention and the details are described thereafter.

TABLE 1

Tests performed for characterizing the catalytic materials

| No. | Property | Characterization Method |
|---|---|---|
| 1 | Crystal structure and size of $TiO_2$ | X-ray diffraction analysis (XRD) and transmission electron microscopy (TEM) |
| 2 | Deposited $VO_x$ | Micro-Raman analysis and temperature programmed reduction (TPR) |
| 3 | BET surface area | Nitrogen physisorption |
| 4 | Surface composition | X-ray photoelectron spectroscopy |

In the following description, the following codes are used to refer to various catalytic materials of the present invention, for example "V1Ti-c-Nb," where the number "1" means loading of the metal oxide catalyst on the support expressed as weight percentage of the total weight, the symbol before the number specifies the catalyst (for example, V=$V_2O_5$), the symbol after the number specifies the support (for example, Ti=$TiO_2$), the small letter "c" means the pretreatment method of oxygen calcination, the small letter "o" means the pretreatment method of flowing ozone, and the symbol following "c" or "o", if any, specifies the promoter (for example, Nb=niobium oxide). Thus, "V1TI-c-Nb" refers to 1% vanadium on $TiO_2$ doped with niobium.

(A) Crystal Structure and Size of $TiO_2$ (i) X-ray Diffraction Analysis (Philips 1080)

1. $TiO_2$ (V1Ti-c and V1Ti-o as comparisons) was ground and sifted to produce a fine powder.
2. The fine powder was placed in an aluminum holder which was then placed in the sample holder of an X-ray diffractometer.
3. A CuKα X-ray source was used and the X-ray diffraction was recorded for 20°<2θ<60° by step-scanning at 0.05° increments.
4. The crystal size was calculated from the peak broadening using the Bragg diffraction equation.

FIG. 1A shows the XRD pattern of pure nano-structured anatase $TiO_2$. FIG. 1B shows the XRD patterns of catalyst V1Ti-c, V1Ti-o. A sharp peak is observed at around 2θ=25.3°, 37.8°, 48.0° and 55.0° are characteristics of anatase $TiO_2$ structure (Table 2). The similarity of the XRD patterns between FIG. 1A and 1B confirms the well dispersion of the active metal oxide over the support $TiO_2$.

TABLE 2

X-ray diffraction data of pure anatase (Cu Kα radiation source, wavelength: 1.54056 Å) (Cited from 1998 JCPDS-Intenational Centre for Diffraction Data)

| 2Θ | d (Å) | Intensity | (hkl) |
|---|---|---|---|
| 25.281 | 3.52 | 100 | 101 |
| 36.946 | 2.431 | 10 | 103 |
| 37.80 | 2.378 | 20 | 004 |
| 38.575 | 2.332 | 10 | 112 |
| 48.049 | 1.892 | 35 | 200 |
| 53.890 | 1.6999 | 20 | 105 |
| 55.060 | 1.6665 | 20 | 211 |
| 62.119 | 1.4930 | 4 | 213 |
| 62.688 | 1.4808 | 14 | 204 |

(ii) Micro-Raman Analysis
1. The $TiO_2$ support (the same fine powder as made in (i) was placed on a glass microscope slide. The spectral resolution was set at approximately at 1.0 $cm^{-1}$ and the spot size was about 2 micrometers in diameter.
2. The Raman spectra of the $TiO_2$ support of the sample were measured using a single monochromator Renishaw plc RM series Raman microscopes equipped with a high power NIR laser (Model 160 series laser system), a cooled CCD detector (−73° C.), a holographic super Notch filter, with an Olympus BH-2 microscope. The objective lens with 20× magnification was selected. The excitation source used was an Argon laser operating at 514.5 nm with an output power of 25 mW.
3. The locations of peak shifts were used to characterize the samples.

Figure 2:
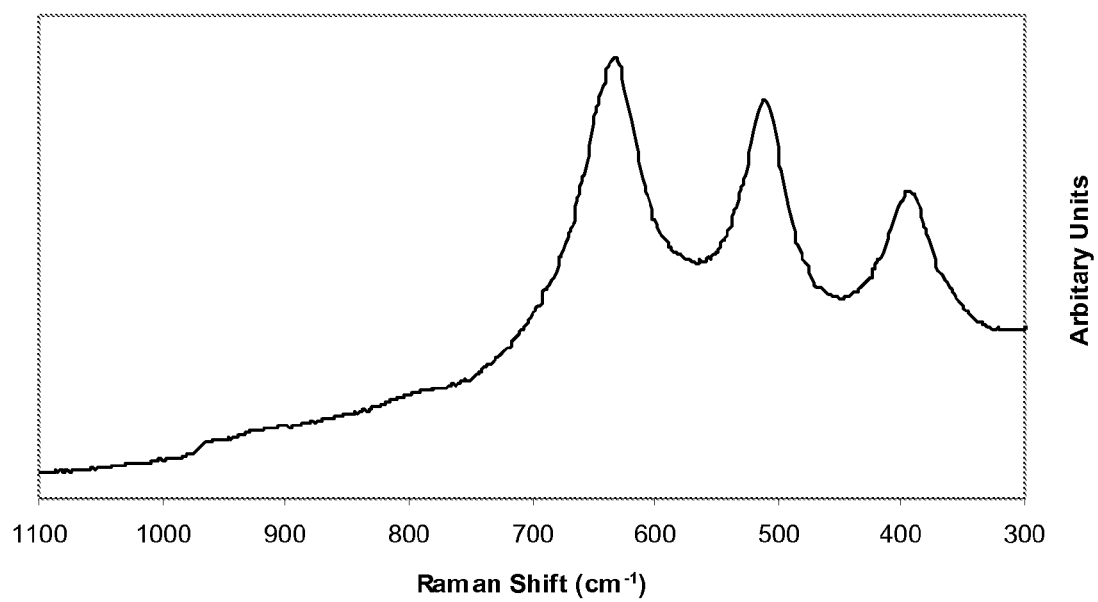
FIG. 2 shows the Raman spectrum of the nanostructured TiO$_2$ crystal.

FIG. 2 shows the Raman spectra of the $TiO_2$ support. The characteristic peaks of pure anatase are located at 395, 511, 634 and 795 $cm^{-1}$.

Figure 3:
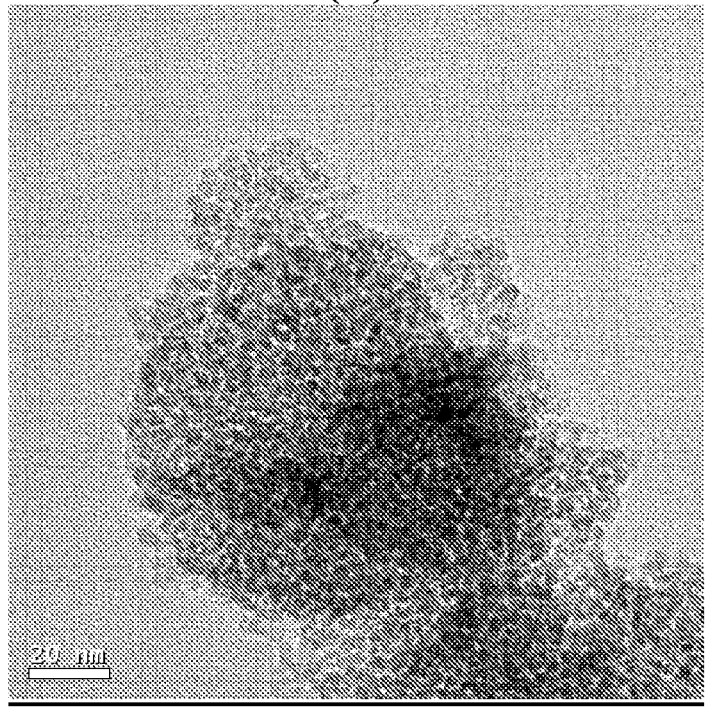
FIG. 3 shows the TEM picture of the nanostrucured TiO$_2$ (A) and of its inner zoon structure (B).
Figure 3:
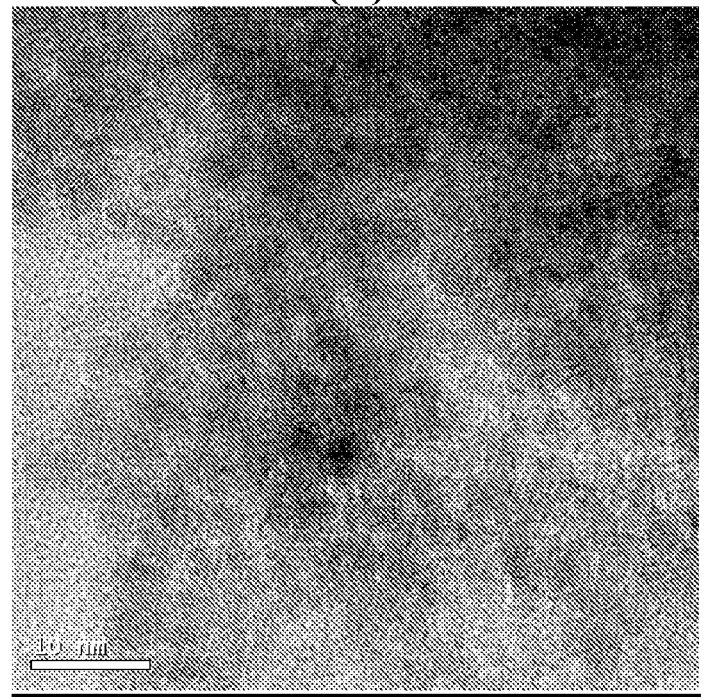

(iii) Electron Microscopy
1. The $TiO_2$ powder, as made in (i), was dispersed in double distilled water (DDI) and placed onto a carbon coated copper grid. The excess liquid was removed using a paper wick and the deposit dried in air prior to imaging. FIG. 3 shows the TEM pictures of the nanostructured $TiO_2$ at 20 nm (A) and 10 nm (B), respectively.
2. The $TiO_2$ was imaged using a JOEL 2010F transmission electron microscope at an accelerating voltage of 200 kV. Routine energy dispersive X-ray spectroscopy (Link Pentafet detector, Link ISIS software, OXFORD Instruments) was conducted to confirm the chemical composition of the imaged particles.

(B) Characteristic of Deposited $VO_3$

The $VO_3/TiO_2$ powder made according to the above-described embodiment was placed in a crucible made of quartz, and the sample was treated with flowing oxygen at 200° C. for 4 hours. The deposited vanadium oxide is then characterized by the following methods.

(i) Micro-Raman Analysis
1. Raman spectra were run with a single monochromator Renishaw plc RM series Raman microscopes equipped with a high power NIR laser (Model 160 series laser system) and a cooled CCD detector (−73° C.) and holographic super Notch filter.
2. The holographic Notch filter removed the elastic scattering while the Raman signal remained very high.
3. The samples were excited with a 514 nm Ar laser.
4. The spectral resolution was ca. 3 $cm^{-1}$ and the spectrum acquisition consisted of 10 accumulations of 10 seconds.
5. The spectra were obtained under dehydrated conditions (ca. 150° C.) in a hot stage (Linkam TS-1500).

Figure 4:
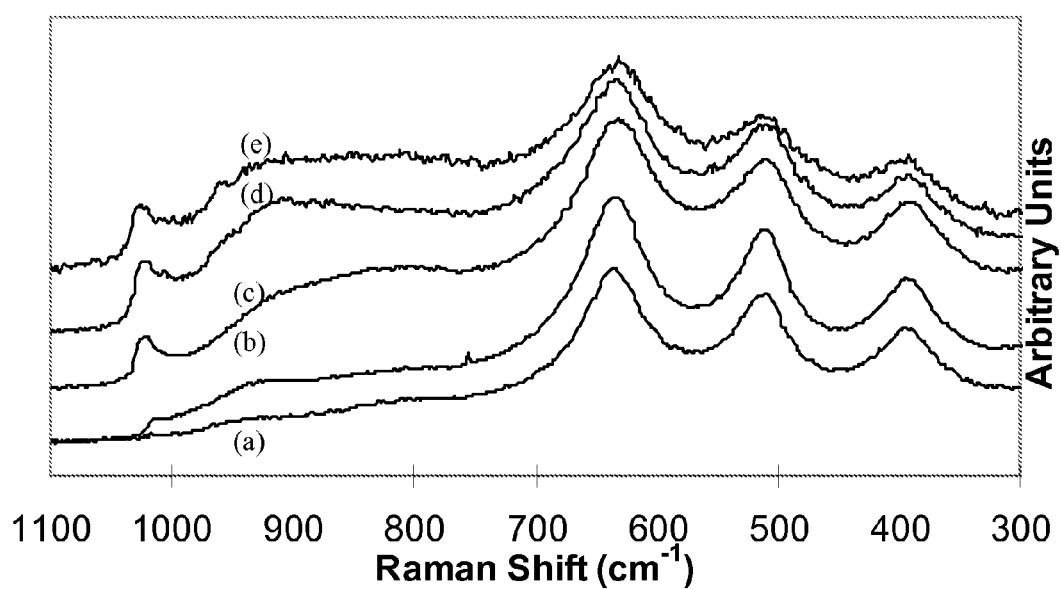
FIG. 4 is a Raman spectra analysis of (a) V1Ti-c, (b)V3Ti-c, (c)V5Ti-c, (d) V10Ti-c and (e) V15Ti-c under dehydrated conditions.

FIG. 4 displays the Raman shift of the vanadium oxide on $TiO_2$. Raman band at 1017 $cm^{-1}$ corresponds to the terminal V=O bond mode. The broad band near 920 $cm^{-1}$ is the characteristic of V—O—V stretching mode of surface polymeric vanadia species.

(ii) Hydrogen Temperature Programmed Reduction ($H_2$-TPR)
1. A piece of quartz wool was placed at the bottom of one leg of a U-shape quartz tube.
2. 0.1 g of the sample $V_2O_5/TiO_2$ powder was placed on the quartz wool.
3. The quartz tube was placed inside the furnace of the Altamira AMI-200 catalyst characterization system.
4. The sample was purged with 50 sccm argon (99.99%) at 150° C. for 2 hours.
5. Temperature programmed reduction was conducted by heating the sample from 50° C. to 900° C. at a ramping rate of 10° C./min in a 10% hydrogen-argon gas mixture.
6. 5 calibration pulses with a 10% hydrogen-argon gas at 50 sccm were obtained for reference.
7. The reducibility of the sample was calculated from the following equations:

Calibration value=(loop volume)×(percent analytical gas)/(mean calibration area)(100);

and Uptake(μmole/g cat)=(analytical area)×(calibration value)/(sample weight)(24.5).

Figure 5:
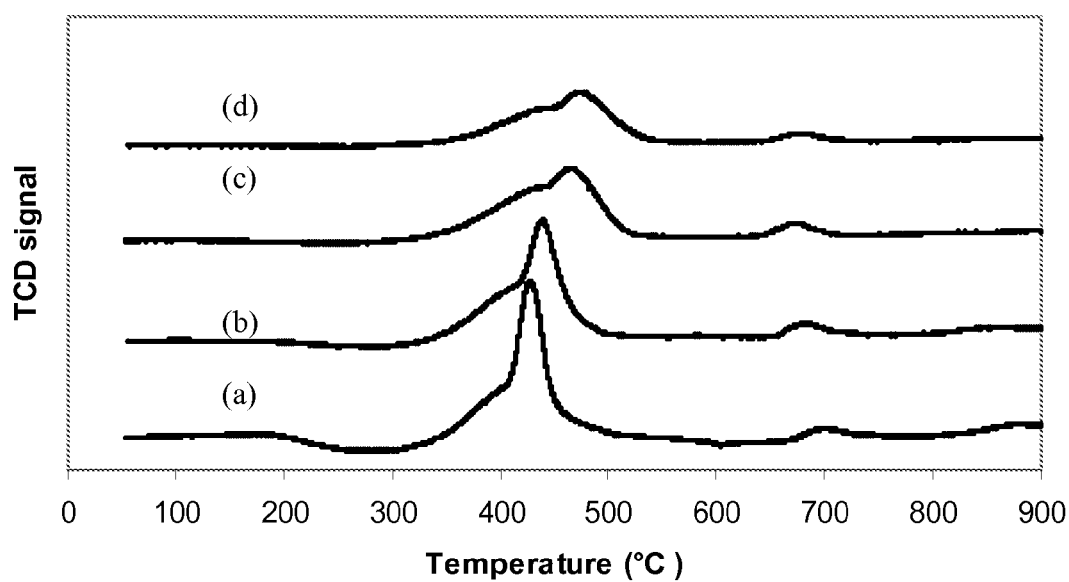
FIG. 5 is a temperature programmed reduction (TPR) profile of (a) V3Ti-c, (b) V5Ti-c, (c) V10Ti-c and (d) V15Ti-c.

FIG. 5 shows TPR of (a) 3%, (b) 5% (c) 10% (d) 15% of vanadium (by weight) on the $TiO_2$ support (iii) BET Surface Area
The BET surface area of the catalyst was measured by a nitrogen physisorption. procedure:
1. The capped quartz tube sample holder from Coulter SA 3100 nitrogen physisorption apparatus was weighed.
2. About 0.1 g of the catalyst $V_2O_5/TiO_2$ powder was measured and placed inside the sample holder.
3. The holder was connected to the out-gassing port of the Coulter SA 3100.
4. The sample was outgassed at 120° C. for 2 hours.
5. The mass of the catalyst was weighed after outgassing and nitrogen physisorption was conducted at 77 K.
6. The BET surface area was calculated from the physisorption data.

The BET surface, particle size and surface vanadia density are summarized as follows:

TABLE 3

Summary of the BET surface, particle size and surface vanadia density

| Sample name | V content (wt. %) metal loading | Bet Surface Area ($m^2$/g) | Anatase $TiO_2$ particle size (nm) | Average surface coverage (V atoms/$nm^2$) |
|---|---|---|---|---|
| $TiO_2$ support | — | 300.0 | 9.59 | — |
| V1Ti-c | 1 | 255.4 | 9.31 | 0.5 |
| V3Ti-c | 3 | 248.3 | 8.75 | 1.4 |
| V5Ti-c | 5 | 253.8 | 9.31 | 2.3 |
| V10Ti-c | 10 | 222.3 | 9.15 | 5.3 |
| V15Vi-c | 15 | 185.4 | 9.36 | 9.6 |
| V1Ti-o | 1 | 255.3 | 8.75 | 0.5 |
| V3Ti-o | 3 | 254.9 | 8.75 | 1.4 |
| V5Ti-o | 5 | 236.2 | 8.85 | 2.5 |
| V10Ti-o | 10 | 216.5 | 8.94 | 5.5 |
| V15Vi-o | 15 | 185.3 | 9.05 | 9.6 |

(iv) X-ray Photoelectron Spectroscopy
The surface composition and chemistry of the catalyst was determined by X-ray photoelectron spectroscopy (XPS). Procedure:
1. The catalyst powder was pressed onto an indium foil.
2. The foil was placed inside the X-ray photoelectron spectroscopy (Physical Electronics PHI 5600).
3. The sample was outgassed at ultra high vacuum.
4. Monochromatic AlKα X-ray source with 350 W at 45° C. was used to bombard the sample.
5. The data was collected using carbon 1s as the reference.

Figure 6:
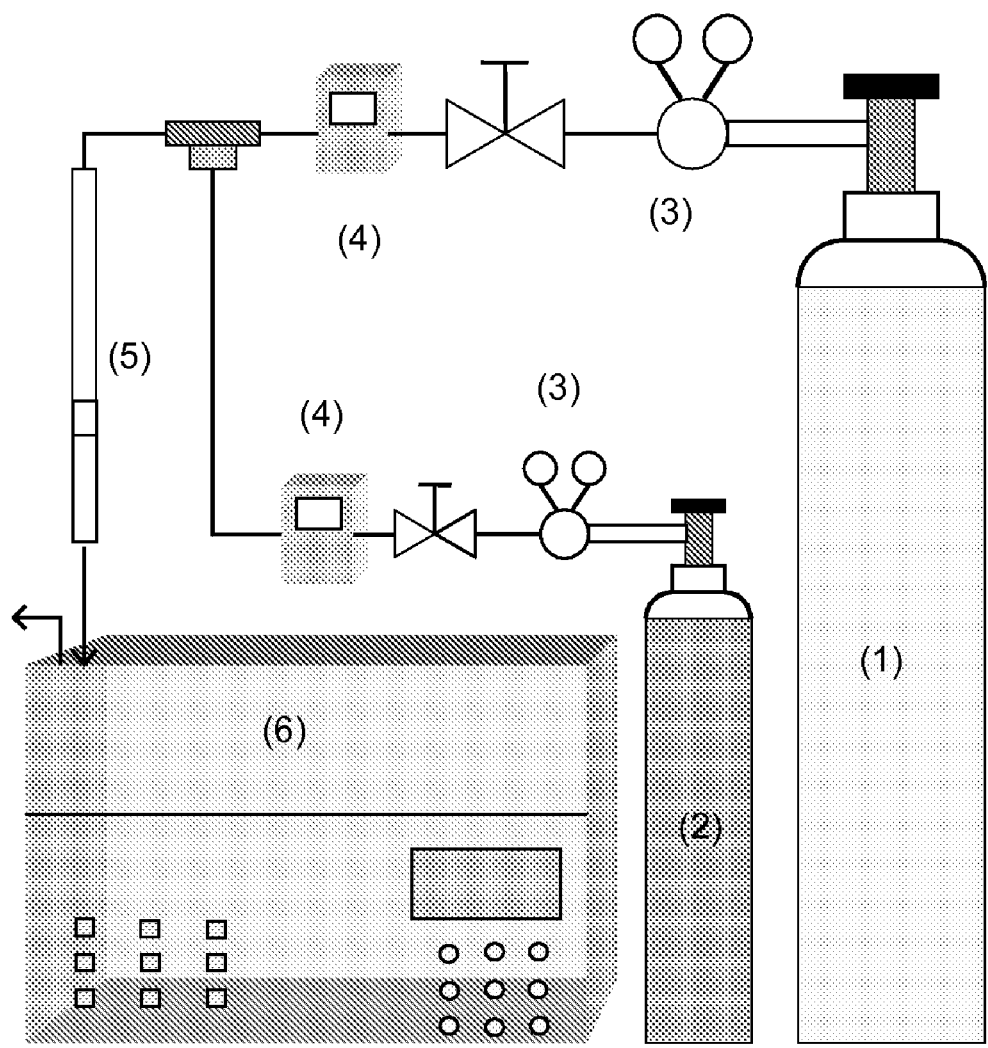
FIG. 6 is a schematic diagram of the setup for testing catalytic effects of the catalytic material of the present invention.

FIG. 6 shows XPS data of surface vanadium/titanium ratio vs. the theoretical vanadium loading on the $TiO_2$ support XRD, BET, TPR and micro-Raman have been used for characterization of the promoted catalyst. Table 4 shows the physicochemical properties of the catalyst samples promoted with niobium made by the pressure described previously.

Figure 11:
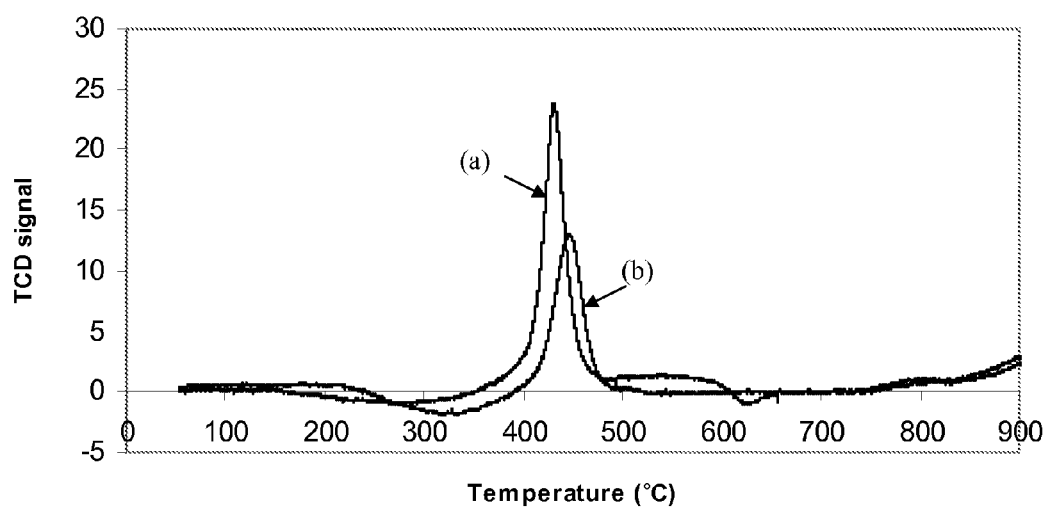
FIG. 11 is the TPR profile of niobium promoted vanadia catalyst (loading 1% by weight), pretreated by (a) calcination and (b) ozonation.
Figure 12:
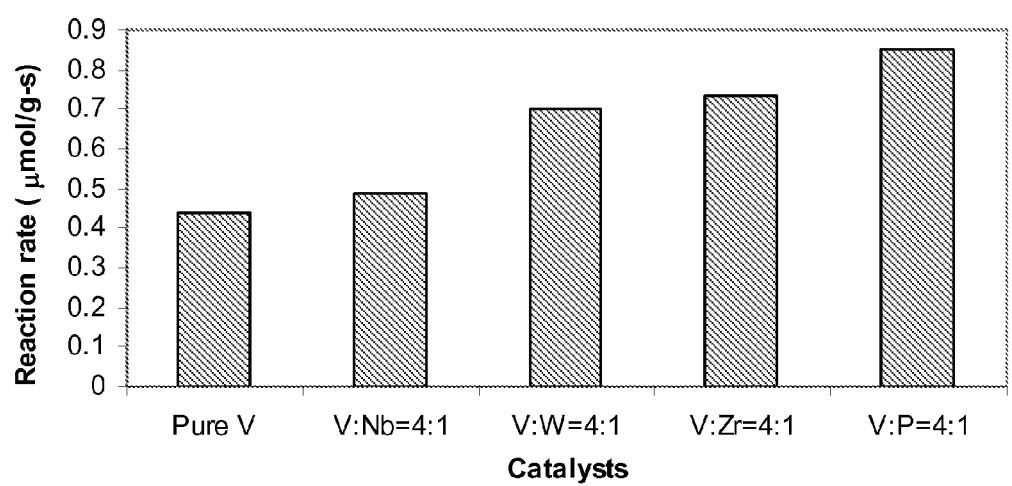
FIG. 12 shows the reaction rate with 1% vanadia by weight on TiO$_2$ with different promoters added (the atomic ratio of V:promoter=4:1).

Ozonation at 200° C. yields a smaller anatase particle size than air calcination at 450° C. In addition, the BET surface area by calcination is smaller which increases the vanadium density. FIG. 11 shows the Raman spectra of the air calcined and ozoned samples and FIG. 12 displays the $H_2$-TPR profile.

TABLE 4

Characterization of the Nb-promoted catalyst.

| Sample Name | V content (wt. %) metal loading | BET Surface Area ($m^2/g$) | Anatase $TiO_2$ particle size (nm) | Average surface coverage (V atoms/$nm^2$) |
|---|---|---|---|---|
| V1Ti-c-Nb | 1 | 111.29 | 13.76 | 1.1 |
| V1Ti-o-Nb | 1 | 280.32 | 8.57 | 0.4 |

(III) Effectiveness of the Catalyst Material on Reaction Rates

Figure 7:
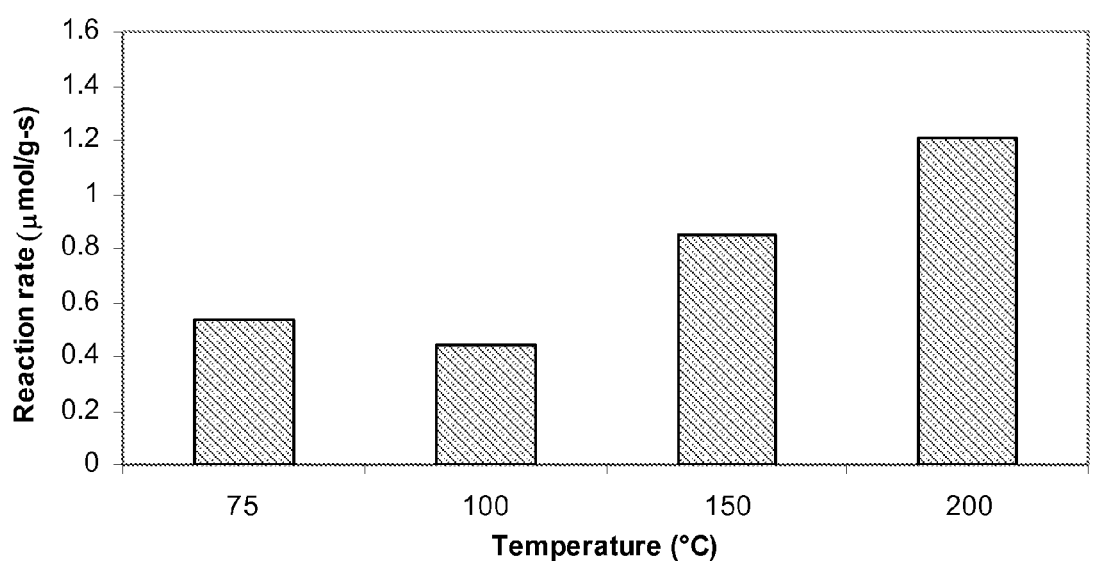
FIG. 7 shows the reaction rate with 4.37% vanadium by weight on TiO$_2$ at different temperatures.

FIG. 7 shows the schematic diagram of the experimental setup used for evaluating the performance of catalysts for the gas-phase oxidation of ammonia ($NH_3$). It consists of synthetic air (1), $NH_3$ (2), pressure regulator (3), mass flow controller (4), glass reactor (5) and analytical instrument (i.e., gas chromatograph) (7). For $NH_3$ oxidation test, synthetic air and $NH_3$ were mixed before entering the glass reactor (5) and the concentration was adjusted by mass flow controller (4). The glass reactor (5) had dimensions of 18-inch length and ¼ inch O.D. The catalyst (6) (about 25 mg) to be tested was placed 12 inch downstream from the entrance. The outlet gases were separated using a Hayesep Q 80/100 column, which was inside the gas chromatograph.

Figure 8:
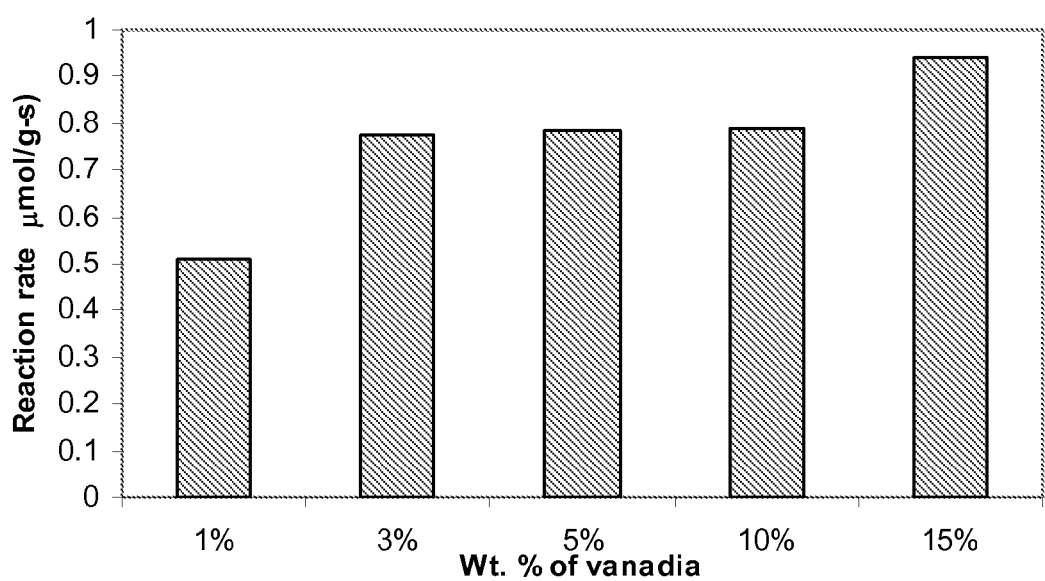
FIG. 8 shows an average reaction rate plot at 75° C. at different vanadia metal loadings, from 1 to 15% by weight.

FIG. 8 plots the reaction rate of $NH_3$ converted to $N_2$ per gram catalyst per second verses temperature with 4.37% vanadium by weight on $TiO_2$. The reaction starts as low as 75° C., a relatively low temperature compared the temperatures used in connection with ordinary selective catalytic oxidation (SCO) catalysts. No $N_2O$ and $NO_x$ formed during the reaction and the complete selectivity to $N_2$ was observed. The metal loading is fixed at 4.37% of vanadium by weight. Obviously, as shown FIG. 10, the reaction rate increases with the increase in temperature. The reaction rate doubles when the temperature reaches 200° C.

Figure 9:
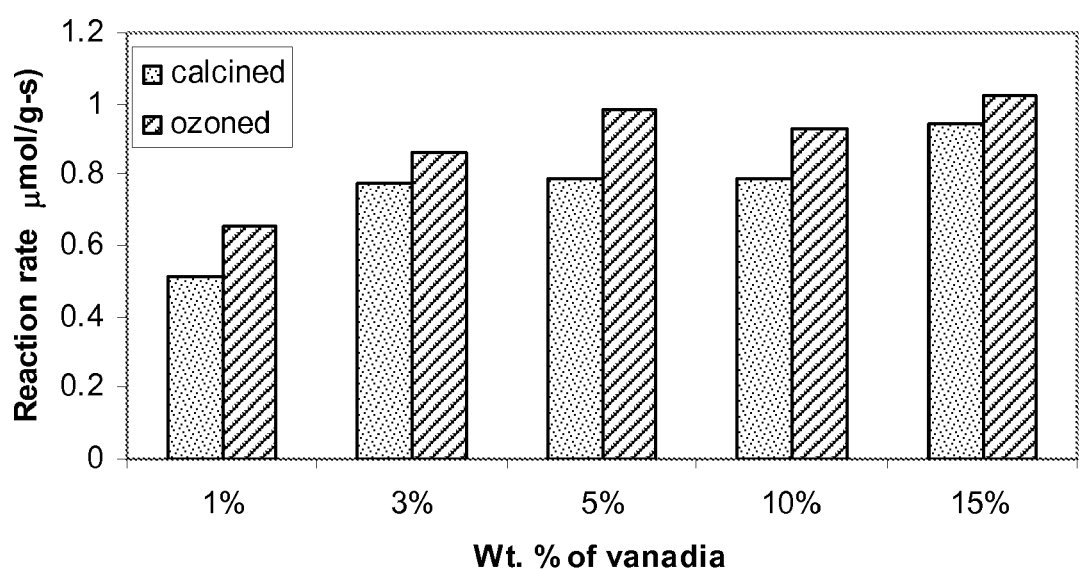
FIG. 9 compares the average reaction rates for the catalysts subjected to different pretreatment processes.

FIG. 9 shows a graph of the reaction rate of $NH_3$ converted to $N_2$ per gram catalyst per second verses catalyst with different metal loading (V1Ti-c, V3Ti-c, V5Ti-c, V10Ti-c, and V15Ti-c) at reaction temperature of 75° C. Increase in metal loading yielded a better performance since there are more available active sites on the support surface for reaction.

Figure 10:
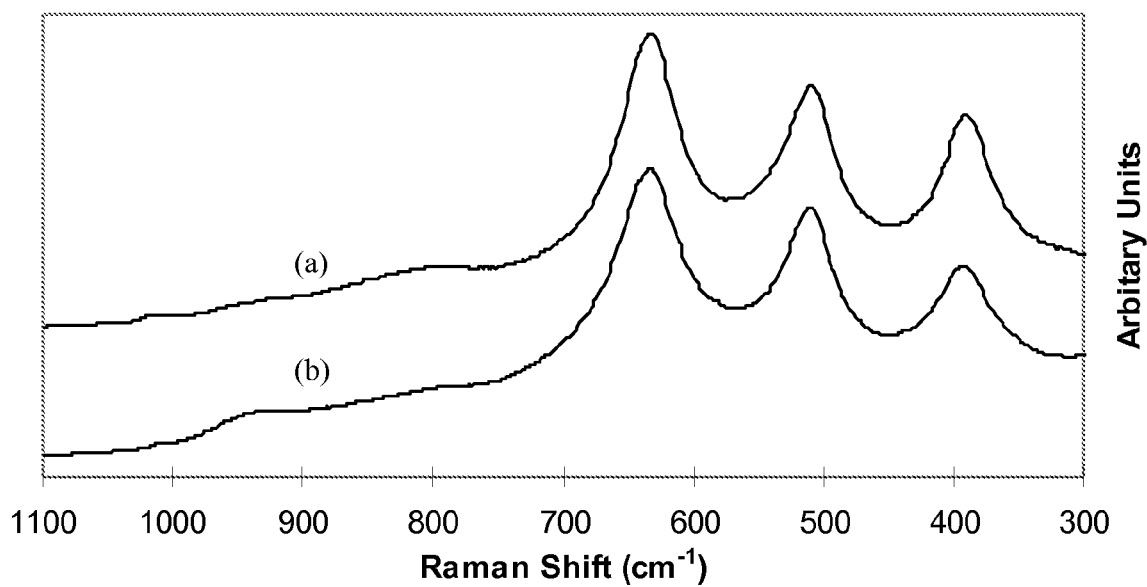
FIG. 10 shows the Raman spectra of the niobium promoted vanadia catalyst (loading 1% by weight), pretreated by (a) calcination and (b) ozonation.

FIG. 10 shows catalyst performance of the catalytic materials with different metal loadings, which have prepared with pretreatment methods, conventional calcination and ozonation, respectively. It shows that ozonation consistently yielded a better conversion than calcinations under the same experimental condition. The results also suggest that active metal oxide loading has positive correlation with the $NH_3$ oxidation rate.

Figure 13:
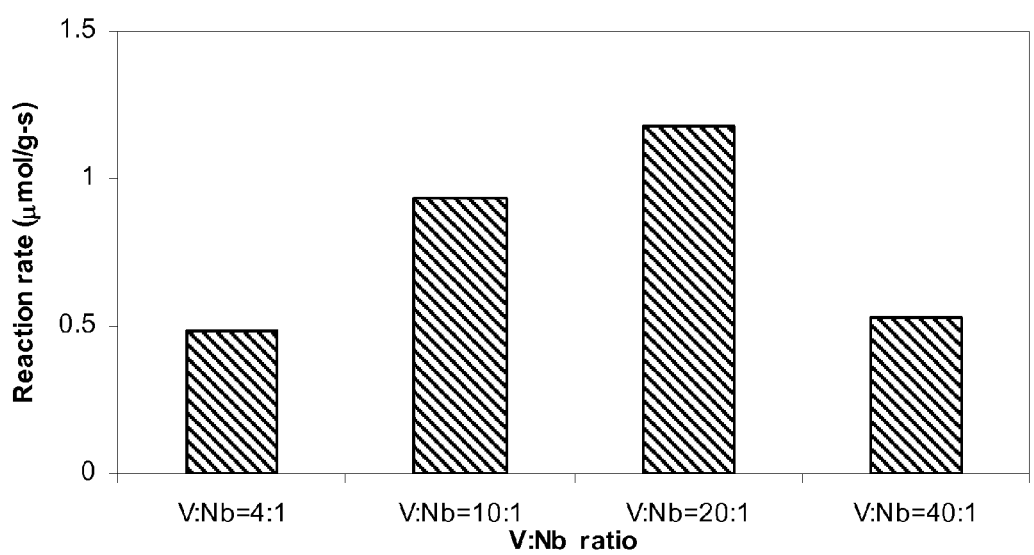
FIG. 13 shows the initial reaction rates with 1% vanadia by weight on TiO$_2$ doped with Nb atoms at an atomic ratio of V:Nb of 4:1, 10:1, 20:1 and 40:1, respectively.

FIG. 13 shows a reaction plot of 1 wt. % vanadia catalyst with different promoters added at the atomic ratio of V:promoter=4:1 at a reaction temperature of 75° C. It clearly shows that the reaction rate increases when promoters are added to the catalysts. The extent of increase varies with the type of promoter added. Phosphorus promoted catalyst yields the highest performance, and its reaction rate almost doubled when compared to the pure vanadia catalyst. Although not intended to be found by the theory, the applicants believe that the addition of the promoter may directly or indirectly interfere with the electronic or catalytic properties of the catalyst, thus improving the activity.

Figure 14:
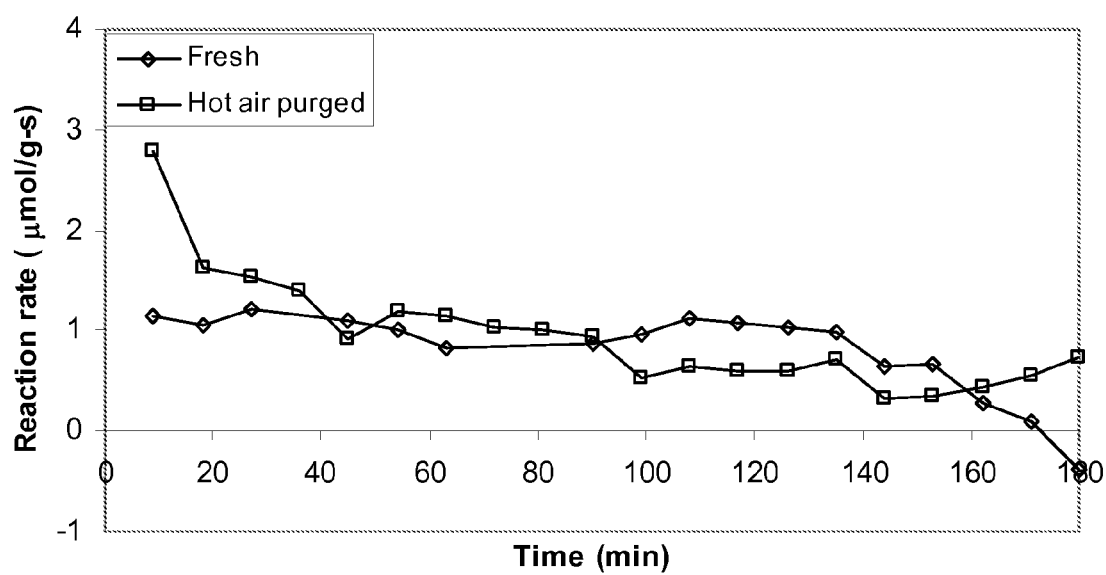
FIG. 14 shows a reaction rate plot for fresh and hot air regenerated catalyst (5% vanadia by weight on TiO$_2$) over 180 minutes.

Turning to FIG. 14, it is believed that the amount of promoter added also plays a role in the improvement of catalytic activity. FIG. 14 shows the reaction plot of 1 wt. % vanadia catalyst doped with different amount of niobium under a typical experimental run. As shown, the initial reaction rate increased with the decrease in the V:Nb ratio until it reached a maximum at V:Nb=20:1, the reaction rate decreased when the V:Nb ratio further decreased to 40:1.

Figure 16:
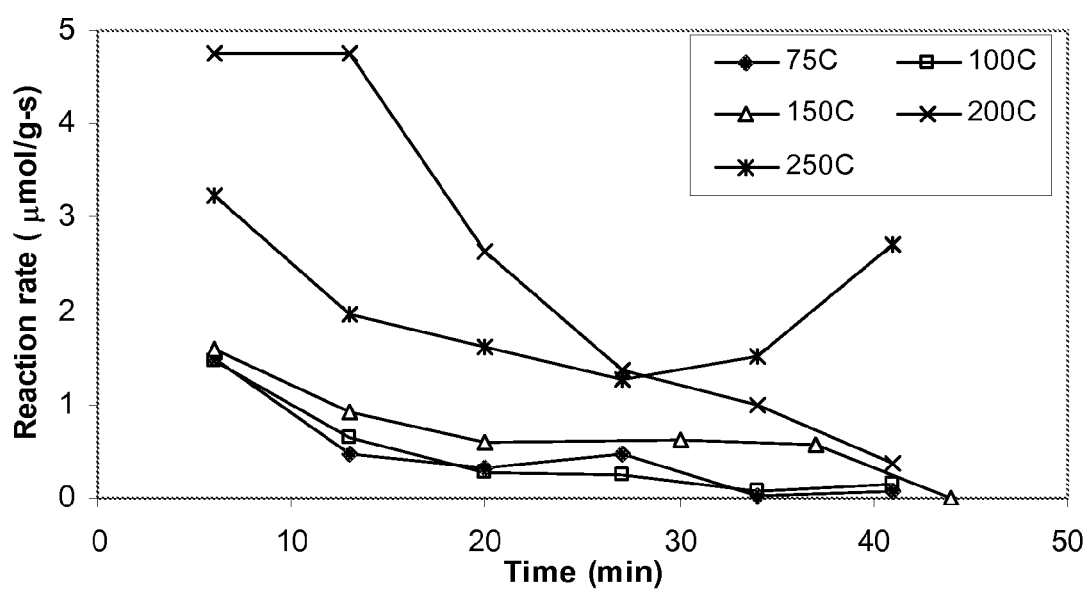
FIG. 16 shows the experimental results on removal of diethylamine (DEA) at different temperatures.

The catalytic material of the present invention, for example, 1% vanadia supported catalyst (V1Ti-c), was shown to be capable of remediation of diethylamine (DEA). V1Ti-c catalyst was tested for the removal of diethylamine (DEA), which has a fishy, unpleasant smell. In this reaction, about 800 ppm of DEA was introduced into synthetic air at 200 sccm. The reaction was conducted at temperatures ranged from 75° C. to 250° C. The catalyst was purged in flowing air before conducting the next temperature point reaction. FIG. 16 shows the schematic diagram of the experimental setup. FIG. 17 shows that catalyst was active for the removal of DEA, though there was deactivation. With the increase in temperature, the extent of deactivation slowed down and complete removal of DEA could be observed at 200° C. for the first 12 minutes. It is contemplated that people with ordinary skill in the art may find the catalytic material of the present invention to be useful in remediation of other nitrogen-containing compounds from the air.

(IV) Regenerability of the Catalyst in Reacting with $NH_3$

In order to avoid frequent replacement of the catalysts, the catalyst should preferably be able to function for a period of time and regenerated by an easy method.

Figure 15:
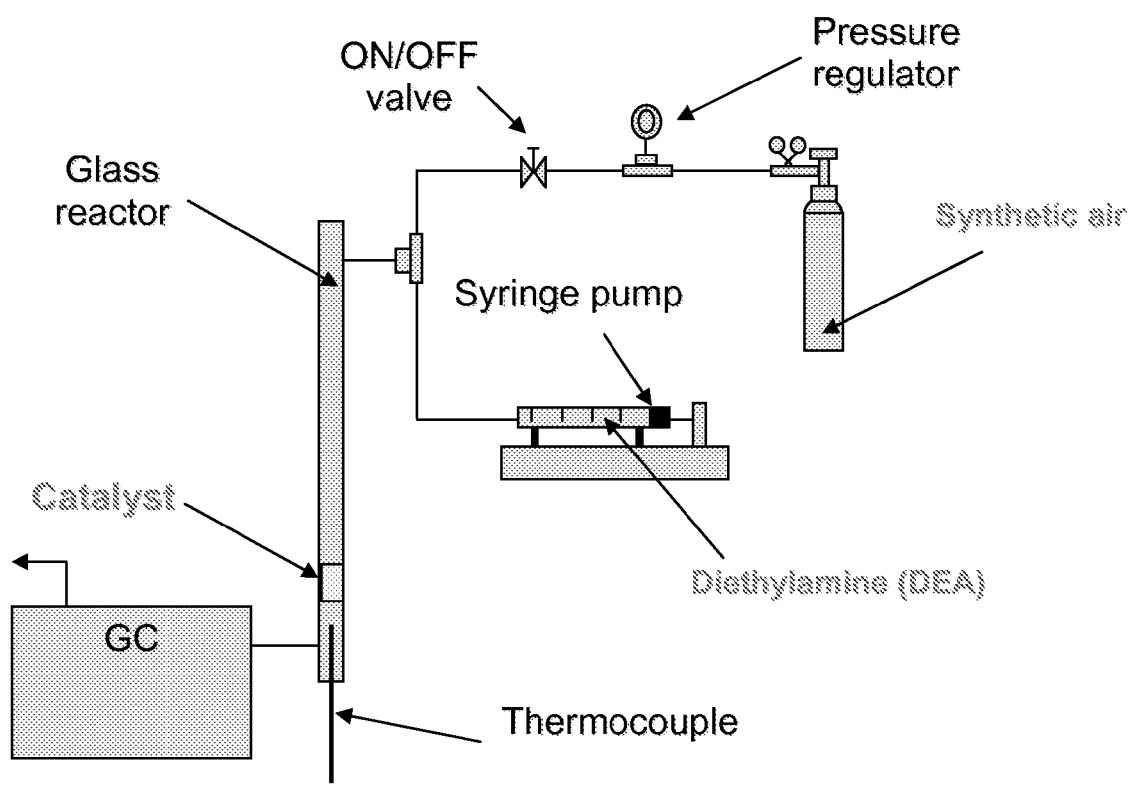
FIG. 15 shows the testing setup for measuring the diethylamine (DEA) reaction.

FIG. 15 shows a reaction curve of $NH_3$ oxidation over the V5Ti-c catalyst at 75° C. for 180 minutes. After that, hot air at 200° C. was fed into the reactor to purge the catalyst surface and regenerate the active sites for reaction. After hot air purging for 180 minutes, the same reaction is conducted and result is compared with the fresh catalyst. As shown in FIG. 14, the fresh V5Ti-c catalyst could sustain its reactivity in the first 120 minutes, and deactivated gradually. After hot air purging for 3 hours, the initial reaction rate was increased to 3.2 μmol/g-s and deactivated mildly over time. It clearly demonstrates that the catalytic effect of the catalytic material of the present invention can be sustained and regenerated by an easy hot air purge procedure.

Table 5 summarizes the average reaction rate, initial reaction rate and deactivation extent for various tested catalyst preparations which was prepared according to the previously described methods. It shows that promoted catalysts are also capable of regeneration after 3 hours reaction at 75° C. by hot air purging. The addition of dopants not only improves the performance of the fresh catalyst, but also decreases the deactivation extent.

TABLE 5

Average reaction rate, Initial reaction rate and Deactivation extent

| Sample | Promotion | Avg. rxn rate over 180 mins | | | | Initial reaction rate t = 0 | | Fresh: Deactivation-Time to reach | | Hot air purged: Deactivation-Time to reach | |
|---|---|---|---|---|---|---|---|---|---|---|---|
| | | Fresh ($R_O$) | t = 0 purged ($R_G$) | Fresh ($R_O$) | Hot air purged ($R_G$) | $0.75R_O$ | $0.5R_O$ | $0.25R_O$ | $0.75R_G$ | $0.5R_G$ | $0.25R_G$ |
| V1Ti-c-Nb | V:Nb = 4:1 | 0.488 | 0.743 | 1.900 | 2.100 | 18 | 24 | 115 | 40 | 58 | 110 |
| V1Ti-o-Nb | V:Nb = 4:1 | 0.413 | 0.711 | 1.200 | 2.350 | 28 | 64 | 96 | 14 | 42 | 78 |
| V1Ti-c-Zr | V:Zr = 4:1 | 0.472 | 0.739 | 2.300 | 2.500 | 22 | 38 | 98 | 12 | 36 | 96 |
| V1Ti-o-Zr | V:Zr = 4:1 | 0.635 | 0.842 | 2.000 | 2.400 | 28 | 64 | 86 | 12 | 32 | 116 |
| V1Ti-c-P | V:P = 4:1 | 0.854 | 0.975 | 1.500 | 1.900 | 62 | 115 | >180 | 32 | 116 | 164 |
| V1Ti-o-P | V:P = 4:1 | 1.193 | 1.100 | 3.300 | 2.500 | 16 | 52 | 124 | 20 | 64 | >180 |
| V1Ti-c-W | V:W = 4:1 | 0.703 | 0.626 | 1.300 | 1.400 | 30 | 52 | >180 | 10 | 44 | 164 |
| V1Ti-o-W | V:W = 4:1 | 0.736 | 0.894 | 1.600 | 2.000 | 36 | 52 | >180 | 16 | 60 | >180 |

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. A catalytic material, comprising:
   a first metal oxide and;
   a second metal oxide; and
   a BET surface area of from 111 to 280 m$^2$/g;
   said first metal oxide being a catalyst of vanadium oxide in a non-crystalline form on said surface of said second metal oxide; and said second metal oxide being a crystal of TiO2 having a surface with a BET surface of about 300 m$^2$/g and a size between 3 and 25 nm before said first metal oxide is covered thereon.

2. The catalytic material of claim 1, wherein said second metal oxide has a size of 7 to 15 nm.

3. The catalytic material of claim 1, wherein said first metal oxide accounts for from 1 to 25% of the total weight.

4. The catalytic material of claim 3, wherein said first metal oxide accounts for from 1 to 15% of the total weight.

5. The catalytic material of claim 1, wherein said second metal oxide comprises a particle size of from 8 to 14 nm.

6. The catalytic material of claim 1, further comprising an average surface coverage of from 0.4 to 1.1 of vanadium atom per nm$^2$.

7. The catalytic material of claim 1, further comprising an initial reaction rate for NH$_3$ oxidation of from 0.4 to 1.2 μmol/g-s.

8. The catalytic material of claim 1, further comprising a regenerated reaction rate for NH$_3$ oxidation of from 0.3 to 1.1 μmol/g-s after being reacted with NH$_3$ for 180 minutes.

9. The catalytic material of claim 1, further comprising an average reaction rate for NH$_3$ oxidation of from 1.2 to 3.3 μmol/g-s over 180 minutes.

10. The catalytic material of claim 1, further comprising an average regenerated reaction rate for NH$_3$ oxidation of from 1.4 to 2.5 μmol/g-s over 180 minutes after being reacted with NH$_3$ for 180 minutes.

11. A method of preparing the catalytic material of claim 1, comprising the steps of:
   (a) depositing a metal catalyst precursor of the first metal oxide on the surface of the second metal oxide, which acts as a metal oxide support;
   (b) converting said metal catalyst precursor to an active oxide catalyst; and
   (c) removing a plurality of hydroxyl groups from the surface of said metal oxide support.

12. The method of claim 11, wherein said step (a) is carried out by a procedure comprising adding a solution of said metal catalyst precursor to an amount of powder of said metal oxide support to form a mixture and drying up said mixture to afford dried power; said step (b) is carried out by heating said dried power at a temperature between 100 and 200° C.; and said step (c) is carried out by further treating said dried powder with ozone at a temperature between 150 to 300° C. or with oxygen calcination at a temperature between 150 to 300° C.

13. The method of claim 12, where said step (b) is carried at 115° C. for 24 hours and step(c) is carried at 200° C. for 4 hours.

14. The method of claim 13, where said metal catalyst precursor is NH$_4$VO$_3$ and said metal oxide support is TIO$_2$.

15. The method of claim 11, further comprising depositing a metal oxide as a promoter on the surface of said metal oxide support, said depositing of said promoter being performed before, after or at the same time as said metal catalyst precursor is deposited on the surface of said metal oxide support.

16. The method of claim 15, wherein said metal catalyst precursor is NH$_4$VO$_3$, said metal oxide support is TiO$_2$, and said promoter is Nb$_2$O$_5$.

17. A method of removing a nitrogen-containing compound from the air by oxidation of said compound catalyzed with the catalytic material of claim 1.

18. The method of claim 17, wherein said oxidation is carried out at a temperature below 100° C.

19. The method of claim 17, wherein said oxidation is carried out at a temperature below 75° C.

20. The method of claim 17, wherein said nitrogen-containing compound is $NH_3$ or diethylamine.

21. The method of claim 20, wherein said nitrogen-containing compound is $NH_3$.

22. A catalytic material, comprising:
a titanium oxide support; and
a vanadium oxide catalyst attached to said support, wherein said material comprises a BET surface area of from 200 to 280 $m^2g$, an anatase $TiO_2$ particle size of from 8.7 to 9.3 nm, and an average surface coverage of from 0.5 to 5.5 V atoms/$nm^2$.

23. The catalytic material of claim 22, wherein said material comprises from 1 to 10 weight percent of said vanadium oxide catalyst.

* * * * *